UNITED STATES PATENT OFFICE.

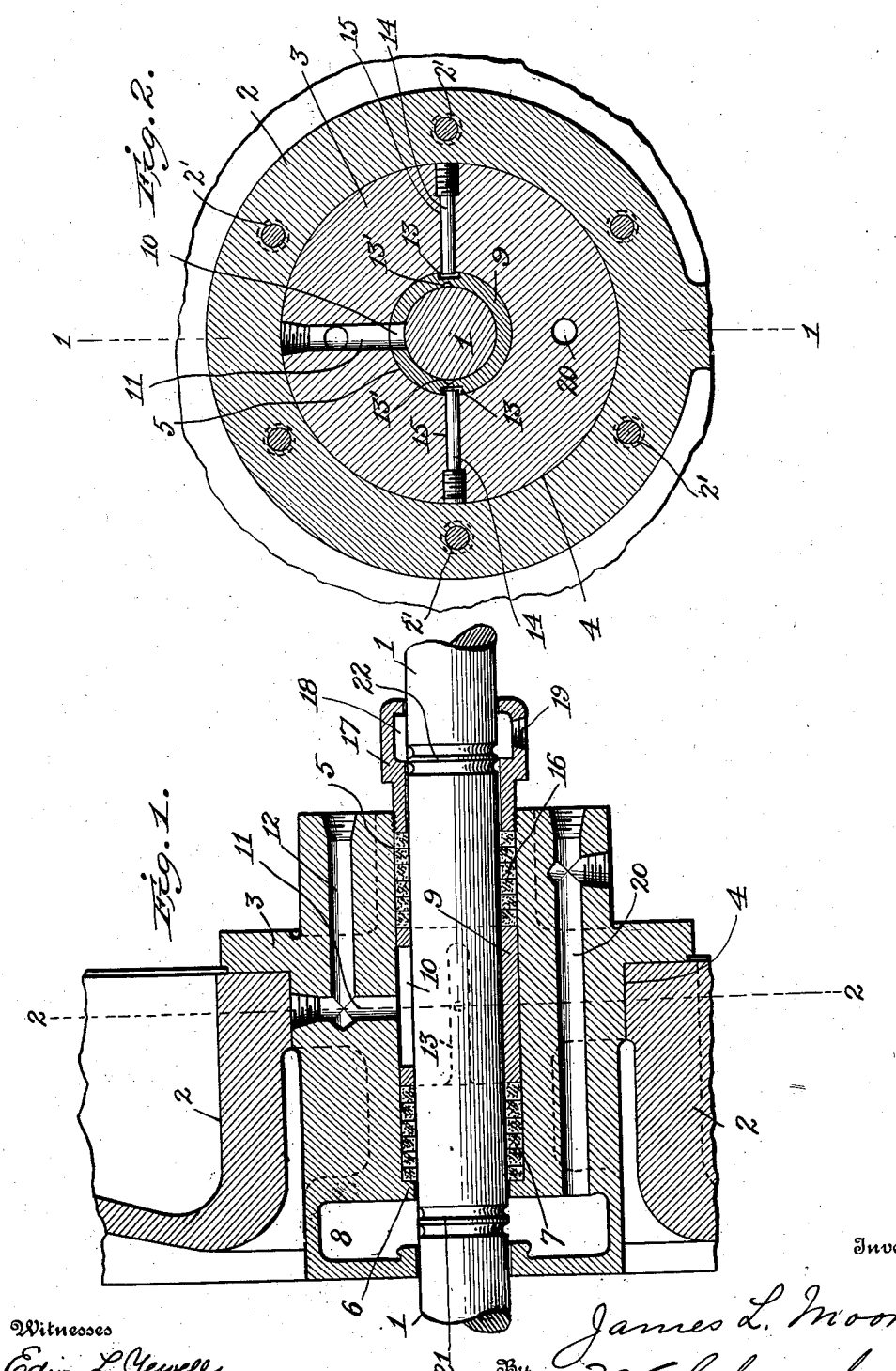

JAMES L. MOORE, OF WELLSVILLE, NEW YORK, ASSIGNOR TO KERR TURBINE COMPANY, OF WELLSVILLE, NEW YORK, A CORPORATION OF NEW YORK.

SHAFT-PACKING FOR STEAM-TURBINES.

No. 860,049.

Specification of Letters Patent.

Patented July 16, 1907.

Application filed November 5, 1906. Serial No. 342,120.

*To all whom it may concern:*

Be it known that I, JAMES L. MOORE, a citizen of the United States, residing at Wellsville, in the county of Allegany and State of New York, have invented certain new and useful Improvements in Shaft-Packing for Steam-Turbines, of which the following is a specification.

My invention relates to a combined shaft packing and bearing for engines and more especially to those intended for use with elastic fluid turbines, as shown for example in patent to Charles V. Kerr, No. 798,105, dated August 29, 1905.

The object of my invention is to provide a combined shaft packing and bearing in which the bearing casting is distinct and removable from the end castings of the turbine, and the bearing shell being so arranged and adjustable along the shaft that pressure may be put on the inside packing in order to take up the wear of the packing and make the joint between the shaft and bearing perfectly fluid tight at all times without having to take the same apart or change the relative arrangements of the different parts of the combined packing and bearing.

The invention consists of features of construction and relation of elements which will be hereinafter more particularly described and pointed out in the appended claims.

In the accompanying sheet of drawing, in which similar reference characters indicate the same parts in the several views, Figure 1 is a central longitudinal section on line 1—1 of Fig. 2 of one of the bearings showing a fragmentary view of the adjacent portion of the end of the turbine casing. Fig. 2 is a transverse sectional view on line 2—2 of Fig. 1.

Referring to the drawings, 1 is the rotary shaft to which the bucket wheels or blades of the rotor element within the casing of a turbine are attached.

2 is a fragmentary portion of one of the ends or heads of the turbine casing surrounding the shaft.

3 is a separable or removable casting or section distinct from the turbine casting, and which may be secured in the opening 4 in the turbine end or head casting 2 by any suitable means as bolts engaging the threaded holes 2' 2'. Said removable section 3 is provided with a central opening 5 having a bore slightly larger than the diameter of the rotary shaft 1. At one end of the opening 5 is a shoulder 6, against which the packing glands 7 are made to abut.

At the left or inner end of the section 3 is provided a chamber 8 which is for the purpose of receiving any oil leaking through the packing glands 7.

9 is a bearing sleeve made of bronze or any other suitable bearing metal annular in cross section, and of such an inside and outside diameter as to snugly fit about the shaft and pass into the annular space formed by the central opening 5 of removable section 3 on the rotary shaft 1. At the upper portion of the sleeve 9 is a longitudinal slit or opening 10 which communicates with a vertical and a horizontal passage 11 and 12, in the removable section 3, said passages being connected to any suitable automatic lubricating oil feed or supply not shown and forming no essential feature of my invention.

13, 13 are diametrically oppositely disposed grooves or slots in the bearing sleeve 9, and are so arranged to be engaged by the inner ends of dowel pins 14, 14 passing through openings 15 in the diametrically opposite sides of the removable sleeve 9.

13', 13' are small pockets formed diametrically opposite on the inner side of the sleeve 9 next to the shaft for the purpose of holding a small quantity of oil and assisting the lubrication. The outer ends or heads of said dowel pins are enlarged, threaded and countersunk for the purpose of retaining them in operative position in the openings 15, which openings are provided with a threaded section at their outer ends to be engaged by the threaded ends of the pins 14, 14.

16, 16 are packing glands surrounding the shaft on right or other side of the bearing sleeve 9 from that of the glands 7, and 17 is a follower which is adapted to be adjusted to or from the sleeve 9 and compress the packing glands 7 and 16 and force them against the rotary shaft and thereby insure a fluid tight and regulable packing between the shaft and the removable section 3.

18 is a chamber formed within the follower adapted to receive any oil or other leakage passing beyond the glands 16, 16 and escape along the shaft.

19 is an opening to be connected to a suitable pipe to drain or lead off the leakage accumulated in the chamber 18.

20 is a passageway in the removable section 3 leading from the inner chamber 8 to the outside, and is for the purpose of carrying off the leakage accumulated in said chamber 8.

21 and 22 are oil or leakage slingers formed by cutting several grooves in the rotary shaft at the points corresponding to the chambers 8 and 18, respectively, and when the oil which leaks beyond the glands passes along the shaft to the ridges formed by the grooves, the centrifugal force throws the oil out into the chambers where it is carried off as above described.

The operation of the invention is as follows:—After the oil has been started to flow from the oil reservoir or cup into the passageways 12 and 11 to the longitudinal slit or opening 10, said oil passes between the rotary shaft 1 and the bearing sleeve 9, which sleeve is prevented from turning with the shaft by reason of the inner ends of the dowel pins engaging the grooves 13, 13, and said sleeve acts as a bearing for the rapidly rotating shaft. Should it be found after the motor has been running for some time that an abnormal flow of lubricant or leakage was passing beyond the packing glands 7 and 16, the follower 17 is adjusted towards the bearing sleeve 9 and thereby compress the glands and reduce the clearance between them and the rotary shaft and stop the leakage. Should it be found that the packing glands are beginning to wear, which manifests itself by abnormal flow of the oil into the chambers 8 and 18, the follower 17 may be easily adjusted during the operation and the leakage stopped without interrupting the operation of the turbine.

From the foregoing description of the structural features it will be seen that I have devised a combined shaft packing and bearing in which the different parts may be readily attached or disconnected from the turbine without disturbing its assembled relations, and any one of its parts can be easily and quickly displaced by a new part should it become worn out or broken.

Various changes may be made in the specific construction of the combined packing and bearing, and while I have shown and described my preferred form, do not care to limit myself to these specific arrangements, as they can be modified in many ways without departing from the spirit of my invention and accomplish the same results; and while I have shown in the drawings the invention as applied to the left end of a turbine casing, it can be simply reversed and made to conform to the other or right end of a turbine casing.

Having now fully described my invention, what I claim as new and desire to secure by Letters Patent is as follows:—

1. A combined shaft packing and bearing for elastic fluid turbines comprising an independent and removable section adapted to be attached in an opening of a turbine casing and provided with a shaft opening, a rotary horizontal turbine shaft passing through the shaft opening, a separate bearing sleeve in said shaft opening and surrounding and supporting the shaft, means for preventing the rotation of said bearing sleeve, means for feeding a lubricant between the bearing sleeve and the shaft, and means in the shaft opening and on each side of the bearing sleeve for providing a fluid tight joint between the shaft and the removable section.

2. A combined shaft packing and bearing for elastic fluid turbines comprising an independent and removable section adapted to be attached in an opening of a turbine casing and provided with a shaft opening, a turbine shaft passing through the shaft opening, a separate bearing sleeve in said shaft opening and surrounding and supporting the shaft, means for preventing the rotation of said bearing sleeve, a slit in the upper portion of the bearing sleeve, a lubricant feed conduit or passage communicating with the said slit, and means in the shaft opening and on each side of the bearing sleeve for providing a fluid tight joint between the shaft and the removable section.

3. A combined shaft packing and bearing for elastic fluid turbines comprising an independent and removable section adapted to be attached in an opening of a turbine casing and provided with a shaft opening, a turbine shaft passing through the shaft opening, a separate bearing sleeve in said shaft opening and surrounding and supporting the shaft, means for preventing the rotation of said bearing sleeve, means for feeding a lubricant between the bearing sleeve and the shaft, means in the shaft opening and on each side of the bearing sleeve for providing a fluid tight joint between the shaft and the removable section, and means for collecting and draining off the leakage passing along the shaft and through the fluid tight joint.

4. A combined shaft packing and bearing for elastic fluid turbines comprising an independent and removable section adapted to be attached in an opening of a turbine casing and provided with a shaft opening, a turbine shaft passing through the shaft opening, a separate bearing sleeve in said shaft opening and surrounding and supporting the shaft, dowel pins passing through the removable section and engaging the separate bearing sleeve, means for feeding a lubricant between the bearing sleeve and the shaft, means in the shaft opening and on each side of the bearing sleeve for providing a fluid tight joint between the shaft and the removable section, oil or leakage slingers adapted to throw off the leakage passing through the fluid tight joints and along the shaft, and receptacles adapted to catch the leakage thrown from the said slingers.

In testimony whereof I affix my signature in presence of two witnesses.

JAMES L. MOORE.

Witnesses:
E. A. RATHBONE,
GEO. B. ROOTH, Jr.